United States Patent
Cheng et al.

(10) Patent No.: US 9,144,029 B2
(45) Date of Patent: Sep. 22, 2015

(54) SYSTEM AND METHOD FOR DOWNLINK POWER OPTIMIZATION IN A PARTITIONED WIRELESS BACKHAUL NETWORK WITH OUT-OF-NEIGHBORHOOD UTILITY EVALUATION

(71) Applicant: BLiNQ Wireless Inc., Ottawa (CA)

(72) Inventors: Ho Ting Cheng, Stittsville (CA); Taiwen Tang, Ottawa (CA); Terasan Niyomsataya, Ottawa (CA); Sorin Alexandru Michnea, Nepean (CA); Radu Bogdan Selea, Vaughan (CA)

(73) Assignee: BLiNQ Wireless Inc., Kanata (CA)

( * ) Notice: Subject to any disclaimer, the term of this patent is extended or adjusted under 35 U.S.C. 154(b) by 0 days.

(21) Appl. No.: 14/462,912

(22) Filed: Aug. 19, 2014

(65) Prior Publication Data

US 2015/0057004 A1 Feb. 26, 2015

Related U.S. Application Data

(60) Provisional application No. 61/868,787, filed on Aug. 22, 2013.

(51) Int. Cl.
*H04W 40/00* (2009.01)
*H04W 52/14* (2009.01)
(Continued)

(52) U.S. Cl.
CPC ............ *H04W 52/146* (2013.01); *H04W 16/10* (2013.01); *H04W 52/143* (2013.01);
(Continued)

(58) Field of Classification Search
CPC ..... H04W 84/18; H04W 72/04; H04W 24/02; H04W 72/042; H04W 24/10; H04W 52/143; H04W 52/146; H04W 16/10
USPC ....................................... 455/446
See application file for complete search history.

(56) References Cited

U.S. PATENT DOCUMENTS

2010/0278152 A1* 11/2010 Andreozzi et al. ............ 370/335
2012/0133557 A1    5/2012 Beaudin
(Continued)

FOREIGN PATENT DOCUMENTS

WO    2012037643 A1    3/2012
WO    2013000068 A1    1/2013

OTHER PUBLICATIONS

Lin, C.R. et al., "Adaptive clustering for mobile wireless networks", Selected Areas in Communications, IEEE Journal on, vol. 15, No. 7, pp. 1265-1275, Sep. 1997.
(Continued)

*Primary Examiner* — Don N Vo
(74) *Attorney, Agent, or Firm* — de Wilton Intellectual Property Inc.; Angela C. de Wilton

(57) ABSTRACT

A system and method for downlink power optimization in a partitioned wireless backhaul network with out-of-neighborhood utility evaluation is disclosed. The method comprises performing initial downlink power optimization for each neighborhood independently, considering only in-neighborhood utilities, by obtaining the transmit powers of all hubs and a utility performance of all served remote backhaul modules (RBMs) in the neighborhood. Power optimization data for each neighborhood are then reported to a central processing unit for storage. Thereafter, for each neighborhood, an out-of-neighborhood utility evaluation is performed by the centralized processing unit, based on reported power optimization data from other neighborhoods, for example, by obtaining delta out-of-neighborhood sum utilities for each hub as a function of hub transmit power, by curve fitting of reported data. Power optimization for each neighborhood is then performed by optimizing both in-neighborhood sum utilities and out-of-neighborhood sum utilities, and hub transmit powers are updated accordingly.

19 Claims, 8 Drawing Sheets

(51) Int. Cl.
    *H04W 52/24*   (2009.01)
    *H04W 16/10*   (2009.01)
    *H04W 52/34*   (2009.01)
    *H04W 52/26*   (2009.01)
    *H04W 52/38*   (2009.01)
    *H04W 52/50*   (2009.01)
    *H04W 24/02*   (2009.01)

(52) U.S. Cl.
    CPC .......... *H04W52/241* (2013.01); *H04W 52/242* (2013.01); *H04W 52/262* (2013.01); *H04W 52/34* (2013.01); *H04W 52/386* (2013.01); *H04W 52/50* (2013.01); *H04W 24/02* (2013.01)

(56) References Cited

U.S. PATENT DOCUMENTS

| | | |
|---|---|---|
| 2012/0236731 A1 | 9/2012 | Beaudin |
| 2012/0281648 A1 | 11/2012 | Dahrouj et al. |
| 2013/0260817 A1 | 10/2013 | Dahrouj et al. |
| 2014/0126500 A1 | 5/2014 | Tang et al. |
| 2014/0126514 A1 | 5/2014 | Tang et al. |
| 2014/0148184 A1 | 5/2014 | Dahrouj et al. |
| 2014/0169200 A1* | 6/2014 | Woo .............................. 370/252 |
| 2015/0038190 A1* | 2/2015 | Carter et al. .................. 455/522 |
| 2015/0201374 A1* | 7/2015 | Yeh et al. ................... 455/422.1 |

OTHER PUBLICATIONS

Abbassi, Ameer Ahmed et al., "A survey on clustering algorithms for wireless sensor networks", Computer Communications, vol. 30, Issues 14-15, Oct. 15, 2007, pp. 2826-2841.

Chen, Geng et al., "Connectivity based k-hop clustering in wireless networks", System Sciences, 2002, HICSS Proceedings of the 35th Annual Hawaii International Conference on, pp. 2450-2459, Jan. 7-10, 2002.

* cited by examiner

SYSTEM AND METHOD FOR DOWNLINK POWER OPTIMIZATION IN A PARTITIONED WIRELESS BACKHAUL NETWORK WITH OUT-OF-NEIGHBORHOOD UTILITY EVALUATION

CROSS-REFERENCE TO RELATED APPLICATIONS

This application claims priority from U.S. Provisional patent application No. 61/868,787, filed Aug. 22, 2013, entitled "System and Method for Downlink Power Optimization with Out-of-neighborhood Utility Evaluation in Partitioned Wireless Backhaul Networks", which is incorporated herein by reference in its entirety.

This application is related to International Patent Application No. PCT/CA2011/001020 and to U.S. patent application Ser. No. 13/230,368, both of which were filed Sep. 12, 2011, entitled "System and Method for Co-Channel Interference Measurement And Managed Adaptive Resource Allocation for Wireless Backhaul", claiming priority from U.S. Provisional patent application No. 61/382,217, filed Sep. 13, 2010; this application is also related to U.S. patent application Ser. No. 14/073,459, entitled "Method and System for Performance Management in Wireless Backhaul Networks via Power Control", filed Nov. 6, 2013, claiming priority from U.S. Patent Provisional patent application No. 61/723,494, entitled "Method and Apparatus for Inter-Cluster Power Management", filed on Nov. 7, 2012; this application is further related to U.S. patent application Ser. No. 13/463,478, entitled "Interference Mitigation with Scheduling and Dynamic Power Spectrum Allocation for Wireless Networks", filed May 3, 2012 claiming priority from U.S. Provisional patent applications No. 61/483,417, filed May 6, 2011 and No. 61/506,895, filed Jul. 12, 2011; all these applications are incorporated herein by reference in their entirety This application is related to U.S. patent application Ser. No. 14/462,859 filed concurrently herewith on Aug. 19, 2014, entitled "System and Method for Self-Optimized Uplink Power Control in a Wireless Backhaul Network", which claims priority from U.S. Provisional application No. 61/868,771, filed Aug. 22, 2013, entitled "System and Method for Self-Optimized Uplink Power Control In Wireless Backhaul Networks", and is incorporated herein by reference.

TECHNICAL FIELD

The present invention relates generally to telecommunications service network technology, and particularly to a system and method for downlink power control in a partitioned wireless backhaul network.

BACKGROUND

Wireless backhaul networks are deployed to carry the traffic between a wireless access network and the core network. For example, a wireless backhaul network may comprise a plurality of hubs, each connected to the wired core network, via Ethernet. Each hub serves multiple remote backhaul modules (RBMs), in a point to multipoint or point to point configuration, using a wireless channel. Each RBM is deployed close to an access network base station, such as a small cell base station, and connected to the base station via a cable. The hubs are deployed at the locations where wired high capacity access to the core network is available, e.g. at a fiber point-of-presence.

In a wireless backhaul network, the term cluster refers to a number of RBMs and their respective serving hub. Performance of an RBM such as throughput is contingent upon its received carrier-to-interference-plus-noise ratio (CINR) and the amount of bandwidth allocated to this RBM given a selected carrier. The received signal strength of an RBM is determined by the transmit power of its serving hub and the pathloss between the serving hub and the RBM. The received interference-plus-noise level of an RBM is determined by the transmit powers of all the interfering hubs and the pathlosses between interfering hubs and the RBM. An RBM is affected by an interfering hub when a desired signal and an interfering signal are transmitted over the same carrier frequency.

In orthogonal frequency division multiple access (OFDMA) wireless networks, the frequency resources are divided into subcarriers or tones. In frequency reuse of 1 multi-sector deployment, transmit power optimization can significantly improve the network performance such as throughput, fairness, and coverage in an interference-limited radio environment. Power optimization in a wireless network generally requires the knowledge of channel gains of all radio links. However, in practice, power optimization across the entire network can be computationally complex. To reduce computational complexity, a wireless network is generally partitioned into several neighborhoods, each comprising a subset of hubs, and power optimization is carried out on a per-neighborhood basis.

By way of example, the following references provide background information on known approaches to clustering of nodes in various types of wireless networks:

(1) Lin, C. R.; Gerla, M., "Adaptive clustering for mobile wireless networks", Selected Areas in Communications, IEEE Journal on, vol. 15, no. 7, pp. 1265-1275, September 1997;

(2) Ameer Ahmed Abbasi, Mohamed Younis, "A survey on clustering algorithms for wireless sensor networks", Computer Communications, Volume 30, Issues 14-15, 15 Oct. 2007, Pages 2826-2841; and (3) Geng Chen; Garcia Nocetti, F.; Gonzalez, J. S.; Stojmenovic, I., "Connectivity based k-hop clustering in wireless networks", System Sciences, 2002, HICSS Proceedings of the 35th Annual Hawaii International Conference on, pp. 2450-2459, 7-10 Jan. 2002.

In a fixed wireless backhaul network, which is partitioned as described herein, each partition or neighborhood comprises a subset of nodes or hub-RBM clusters, i.e. a subset of one or more hubs and the RBMs served by the subset of hubs. To reduce computational complexity for power optimization, each neighborhood has access only to the channel gains of the RBM-to-hub radio links within the same neighborhood. However, system performance tends to degrade if each partition or neighborhood tries to maximize its sum utility by optimizing its own power levels independently of other partitions or neighborhoods. Employing the same power optimization method independently in each neighborhood will result in higher hub transmit power and hence, poorer overall system performance.

Most of the existing power control schemes in partitioned wireless networks consider a network partitioning boundary in which the performance degradation of power control algorithms due to network partitioning is less than a certain threshold. However, this methodology generally requires a joint power control and network partitioning optimization, which can be computationally expensive. Another method is to apply power control algorithms within a network partition or neighborhood, which do not take into account the effect of in-neighborhood power control on the utilities of RBMs in other neighborhoods, referred to as out-of-neighborhood utilities. In one proposed solution, each hub exchanges their utilities with neighbouring hubs, e.g. via primal-dual decomposition. However, this approach is not scalable. Thus, there is a need for a system and method for power optimization in partitioned wireless backhaul networks which reduces performance degradation relative to known solutions.

An object of the present invention is to provide an improved or alternative method and system for downlink power control in partitioned wireless backhaul networks, particularly for wireless backhaul networks comprising fixed or stationary nodes with directional antennas, including small cell non-line-of-sight (NLOS) backhaul networks.

SUMMARY OF INVENTION

The present invention seeks to eliminate, or at least mitigate, disadvantages of known systems and methods, or at least provide an alternative.

Aspects of the invention provide a system and method for downlink power optimization in a partitioned wireless backhaul network with out-of-neighborhood utility evaluation, which comprises performing a downlink power optimization for each neighborhood independently considering only in-neighborhood utilities; reporting power optimization data for each neighborhood to a central processing unit and storing reported data for each neighborhood; and thereafter, for each neighborhood, performing an out-of-neighborhood utility evaluation based on reported power optimization data from other neighborhoods, and then performing a power optimization comprising optimizing both in-neighborhood sum utilities and out-of-neighborhood sum utilities for the neighborhood.

For example, the out-of-neighborhood utility evaluation of reported data from other neighborhoods comprises obtaining delta out-of-neighborhood sum utilities for each in-neighborhood hub as a function of hub transmit power. Consideration of both in-neighborhood and out-of-neighborhood utilities for downlink power optimization provides for reduced performance degradation in partitioned networks compared with optimizing downlink hub transmit power independently for each neighborhood.

A first aspect of the invention provides a method of downlink power optimization in a partitioned fixed wireless backhaul network comprising a plurality of nodes, wherein each node comprises one or more hub modules, and each hub module serves one or more remote backhaul modules (RBMs) through hub-RBM radio links, the network being partitioned into a plurality of neighborhoods, each comprising a subset of the plurality of nodes, the method comprising: for each neighborhood independently, performing a downlink power optimization by optimizing a sum utility over the neighborhood comprising in-neighborhood utilities only; reporting power optimization data to a centralized processing unit; storing reported power optimization data for each neighborhood for look-up by the centralized processing unit; in the centralized processing unit, for each neighborhood, performing a downlink power optimization by optimizing a sum utility comprising in-neighborhood utilities and out-of-neighborhood utilities, said out-of-neighborhood utilities being obtained by an out-of-neighborhood utility evaluation of the stored power optimization data reported by other neighborhoods; and issuing hub transmit power update commands.

For example, for each neighborhood comprising m hubs, the reported power optimization data comprise sets of data for a plurality of different hub transmit powers comprising a hub transmit power of hub m, hub transmit powers for each other hub of the neighborhood and an RBM utility of each served RBM. For example, the utility of an RBM is its throughput performance.

The reported data may be stored by the centralized processing unit in a look-up table. For each neighborhood, the out-of-neighborhood sum utility evaluation may comprise for each hub m of the neighborhood, obtaining from the power optimization data reported from said other neighborhoods, a sum utility of out-of-neighborhood RBMs for each reported transmit power of hub m. For example, the out-of-neighborhood utility evaluation may comprise, obtaining from the power optimization data reported from said other neighborhoods, a function comprising a delta sum utility of all out-of-neighborhood RBMs for each transmit power of hub m.

For example, the out-of-neighborhood utility evaluation comprises: performing a look-up of reported power optimization data for each hub m and forming a secondary look-up table with reported power optimization data specific to each hub m; from data in the secondary look-up table for hub m, computing a sum utility $U_{mo}$ of all RBMs in said one or more other neighborhoods for a current transmit power of hub m and computing a sum utility $U_{mk}$ of said RBMs in said one or more other neighborhoods for each other reported transmit power k of the hub m; computing a delta sum utility $\Delta U_{mk} = U_{mo} - U_{mk}$ for transmit power k relative to the current transmit power, thereby generating a plurality of data points $(P_{m1}, \Delta U_{m1}) \ldots (P_{mk}, \Delta U_{mk})$; applying curve fitting to obtain a polynomial function $f_m$ that closely fits the data points $\Delta U_m = f_m(P_m)$.

In one example, the fitted polynomial function for each hub m provides a delta sum utility of all out-of-neighborhood RBMs for each power level option. Curve fitting of the reported data may be applied before or after adaptive modulation and coding.

Thereafter, power optimization is carried out considering both in-neighborhood and out-of-neighborhood utilities.

In one embodiment, the method comprises, for each neighborhood $NBH_i$, performing power optimization considering in-neighborhood and out-of-neighborhood utilities, comprises optimizing the hub transmit power levels so as to maximize the sum of RBM utilities using the following sum utility objective function:

$$\Sigma_{m \in NBH_i} \{U_m(P_m) + \beta_m \Delta U_m(P_m)\}$$

where $P_m$ is the transmit power of the m-th hub, $U_m(P_m)$ is the utility of the m-th hub obtained given $P_m$, $\Delta U_m(P_m)$ is the delta out-of-neighborhood utility given $P_m$, and $P_m$ is a tunable parameter.

After downlink power optimization with both in-neighborhood and out-of-neighborhood utilities, updating of hub transmit power levels may be performed simultaneously or sequentially for each neighborhood.

Thus, both an in-neighborhood sum utility and an out-of-neighborhood sum utility are considered for each neighborhood. The out-of-neighborhood utility is preferably evaluated at a centralized server, e.g. a MARA server, based on actual obtained throughput performance at each hub and applying a curve-fitting method to estimate out-of-neighborhood utilities. Preferably, the out-of-neighborhood utility evaluation is based on a table lookup, which is trained on a regular basis. For example, time may be divided into cycles and the method implemented with a data collection phase, a parameter training phase and a parameter application phase. The parameter application phase becomes the data collection phase for a subsequent cycle, and cycles may be repeated as necessary, e.g. to attain a target performance or when there are changes to the RF or interference environment.

In an alternative embodiment, the initial power optimization may be based on estimated data from a pre-deployment tool, wherein the estimated data is used to generate and report power optimization data to populate the look-up table.

Another aspect of the invention provides a system for downlink power optimization in a partitioned fixed wireless backhaul network comprising a plurality of nodes, wherein each node comprises at least one hub module, and each hub module serves one or more remote backhaul modules (RBMs) through hub-RBM radio links, the network being partitioned into a plurality of neighborhoods, each comprising a subset of the plurality of nodes, and the system comprising:

a centralized processing unit in communication with each hub;
a centralized or distributed computer readable storage medium storing programming instructions for execution by the centralized processing unit and/or processing units of each hub, said programming instructions implementing the steps of:
   for each neighborhood independently, performing a downlink power optimization by optimizing a sum utility over the neighborhood comprising in-neighborhood utilities only; and reporting power optimization data to the centralized processing unit for storage;
data storage means for storing said reported power optimization data for each neighborhood for look-up by the centralized processing unit;
said programming instructions further implementing the steps of:
   in the centralized processing unit, for each neighborhood, performing a downlink power optimization by optimizing a sum utility comprising in-neighborhood utilities and out-of-neighborhood utilities, said out-of-neighborhood utilities being obtained by an out-of-neighborhood utility evaluation of the stored power optimization data reported by other neighborhoods; and
issuing hub transmit power update commands.

For example, said data storage means stores, for each neighborhood comprising m hubs, reported power optimization data comprise sets of data for each of a plurality of different hub transmit powers, wherein each set comprising: a hub transmit power of hub m, a hub transmit power for each other hub of the neighborhood and a RBM utility of each served RBM. The data storage means may comprise a look-up table storing the reported power optimization data for all neighborhoods, and secondary look-up tables, storing for each hub m, a sum utility of out-of-neighborhood RBMs for each reported transmit power of hub m, and a delta sum utility of all out-of-neighborhood RBMs for each transmit power of hub m relative to the current transmit power of hub m.

In one embodiment, the data storage means comprises a look-up table, storing reported power optimization data for all neighborhoods; and further comprises, for each neighborhood, secondary look-up tables storing for each hub m of the neighborhood, data for each hub m comprising a sum utility $U_{mo}$ of all RBMs in said one or more other neighborhoods for a current transmit power of hub m, a sum utility $U_{mk}$ of said RBMs in said one or more other neighborhoods for each other reported transmit power k of the hub m; a delta sum utility $\Delta U_{mk}=U_{mo}-U_{mk}$ for transmit power k relative to the current transmit power, to provide a plurality of data points $(P_{m1}, \Delta U_{m1}) \ldots (P_{mk}, \Delta U_{mk})$; and the programming instructions further implement curve fitting to obtain a polynomial function $f_m$ that closely fits the data points $\Delta U_m=f_m(P_m)$.

In one embodiment, said programming instructions perform power optimization considering in-neighborhood and out-of-neighborhood utilities, comprising optimizing the hub transmit power levels so as to maximize the sum of RBM utilities using the following sum utility objective function:

$$\Sigma_{m \in NBH_i}\{U_m(P_m)+\beta_m \Delta U_m(P_m)\}$$

where $P_m$ is the transmit power of the m-th hub, $U_m(P_m)$ is the utility of the m-th hub obtained given $P_m$, $\Delta U_m(P_m)$ is the delta out-of-neighborhood utility given $P_m$, and $\beta_m$ is a tunable parameter.

Stored data for the fitted polynomial function for each hub m provides a delta sum utility of all out-of-neighborhood RBMs for each power level option.

The programming instructions may provide for updating of hub transmit power levels after optimization: a) simultaneously in all neighborhoods, or b) sequentially by neighborhood.

A further aspect of the present invention provides a centralized or distributed computer readable storage medium storing reported data and storing programming instructions for execution by one or more processing units of a fixed wireless backhaul network comprising a plurality of nodes, wherein each node comprises at least one hub module, and each hub module serves one or more remote backhaul modules (RBMs) through hub-RBM radio links, said programming instructions implementing, in one or more of said processing units, power optimization with consideration of in-neighborhood and out-of-neighborhood utilities as described herein.

Thus, an improved or alternative method and system for downlink power control in a partitioned wireless backhaul network is provided, with particular application for wireless backhaul networks comprising fixed or stationary nodes with directional antennas, including small cell non-line-of-sight (NLOS) backhaul networks.

The foregoing and other objects, features, aspects and advantages of the present invention will become more apparent from the following detailed description, taken in conjunction with the accompanying drawings, of preferred embodiments of the invention, which description is by way of example only.

DESCRIPTION OF EXEMPLARY EMBODIMENTS

A system and method for downlink power optimization in a partitioned wireless backhaul network with out-of-neighborhood utility evaluation will be described, by way of example, with reference to a NLOS wireless backhaul network 100 as illustrated schematically in FIG. 1, which represents schematically the topology of a system comprising a point-to-multipoint wireless backhaul network, comprising a plurality of fixed nodes. The nodes comprise a plurality of hubs 102 and RBMs 104.

Figure 1:
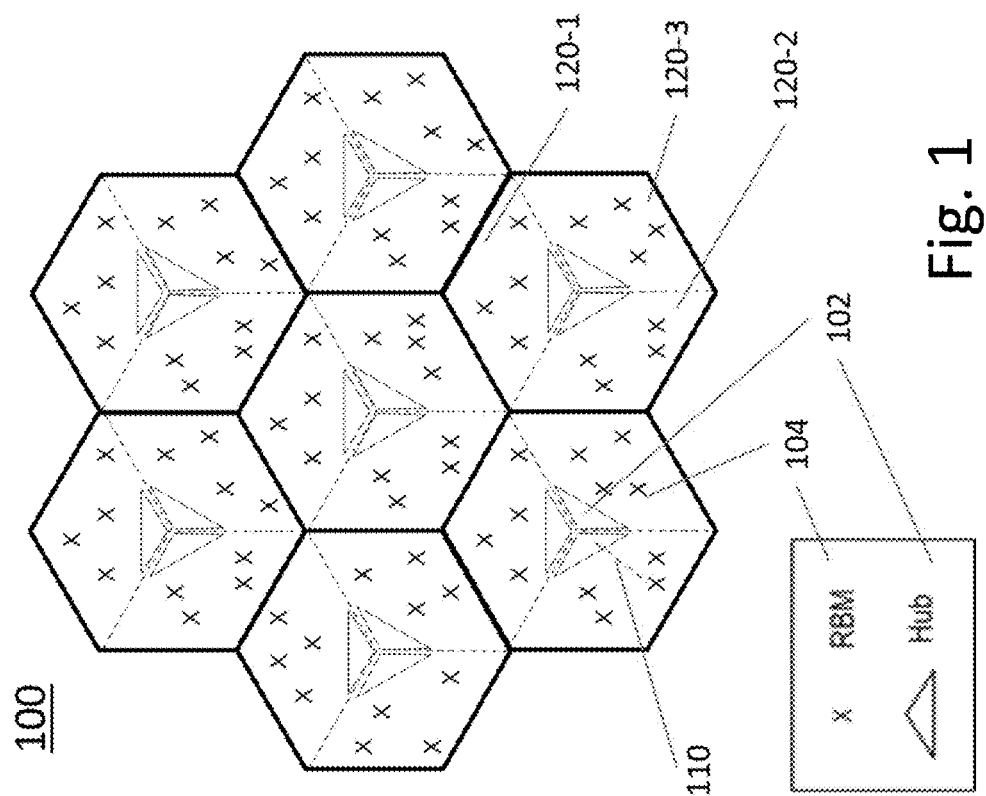
FIG. 1 shows a schematic diagram of a wireless backhaul network comprising a plurality of hubs, each hub serving a plurality of Remote Backhaul Modules (RBMs) for implementing a method for downlink power optimization in a partitioned wireless backhaul network according to an embodiment of the present invention.

As an example only, the wireless backhaul network 100 shown in FIG. 1 comprises a plurality of seven sites or cells, each site comprising three hub modules 102, with each hub module serving a sector 120 comprising a cluster of a plurality of Remote Backhaul Modules (RBMs) 104. Thus, there are 21 sectors, each with a hub module 102, serving a cluster of up to four RBMs. As shown, three hubs modules 102, each with directional antenna, are co-located in each of the cell centers, with a cluster of RBMs mapped to each respective serving hub module in each of the three sectors 120-1, 120-2 and 120-3 of the cell.

Figure 2:
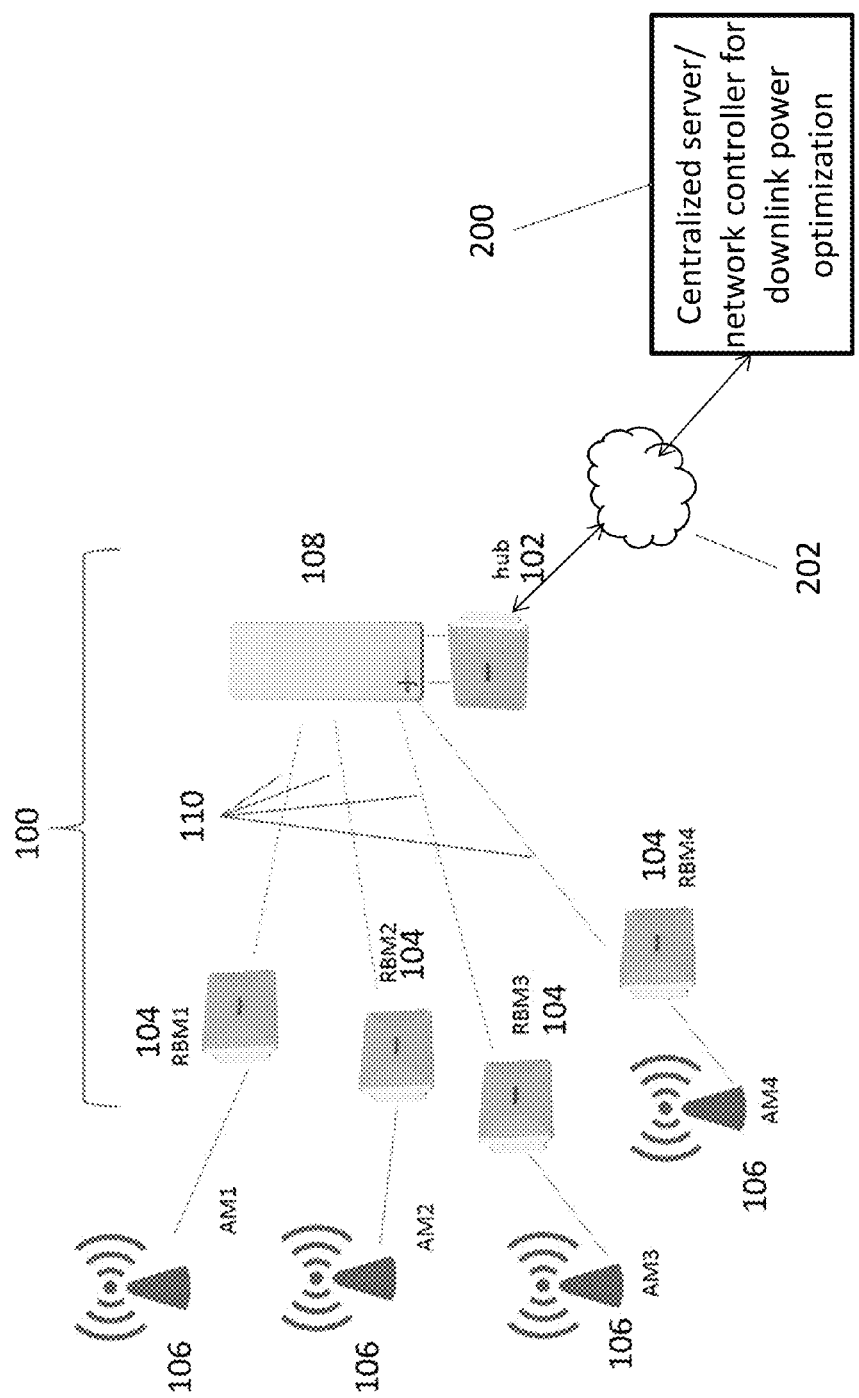
FIG. 2 shows a schematic diagram of part of the wireless backhaul network comprising one cluster of four RBMs served by a hub module, each RBM being connected to an access module of an access network, and wherein the hub has a connection to a centralized control server for coordinating downlink power optimization across a partitioned wireless backhaul network.

In each sector 120, a hub 102 serves its set or cluster of Remote Backhaul Modules (RBMs) 104 through wireless links, i.e. hub-RBM radio links 110, as shown schematically in FIG. 2. Each RBM 104 communicates with and is co-located with an access module (AM) 108 of an access network, such as a small cell-base station, using a wired connection, e.g. an Ethernet cable. The hub module 102 may have a multi-beam antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network. Also shown in FIG. 2 is a communications link 202 from the hub 102 to a centralized server or controller 200, for managing control functions of the wireless backhaul network.

Figure 8:
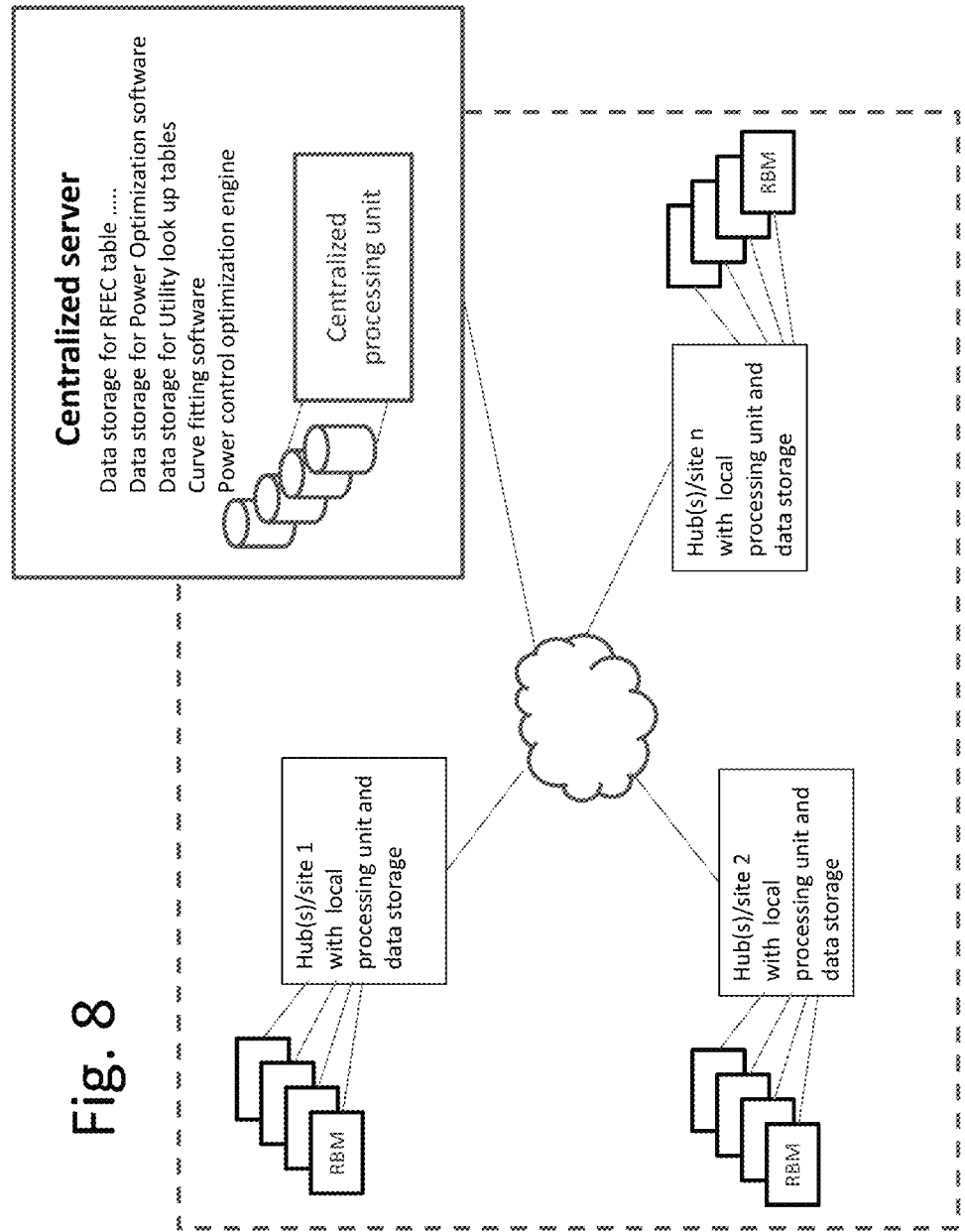
FIG. 8 is a block diagram which represents schematically elements of a system comprising a centralized control server for implementing downlink power optimization in a partitioned wireless backhaul network with out-of-neighborhood utility evaluation.

FIG. 8 is a block diagram that represents schematically elements of a system comprising a centralized control server with a processing unit and storage means for implementing downlink power optimization in a partitioned wireless backhaul network with out-of-neighborhood utility evaluation.

In wireless NLOS backhaul networks, the goal of network partitioning is to reduce the computational complexity (computational overhead) of a resource allocation algorithm such as power optimization. A whole wireless backhaul network is partitioned into a number of clusters of nodes, referred to as radio frequency neighborhoods or simply neighborhoods. Each neighborhood comprises a subset of hubs and served RBMs, where each RBM measures and reports its pathloss to every hub in the neighborhood. The pathloss information for each hub-RBM radio link can be obtained using the method disclosed in the above mentioned related patent applications entitled "System and Method for Co-Channel Interference Measurement And Managed Adaptive Resource Allocation for Wireless Backhaul" (International Patent Application No. PCT/CA2011/001020, and U.S. patent application Ser. No. 13/230,368, both filed Sep. 12, 2011). As disclosed in these applications, each hub reports performance metrics for hub-RBM radio links for each RBM to a centralized server (MARA server) to allow for centralized resource scheduling. For downlink power control on a per-neighborhood basis, if the pathloss information is obtained only for hubs and RBMs in the same neighborhood, i.e. to reduce computational complexity, and the pathloss information for hubs and RBMs outside of the neighborhood (out-of-neighborhood) is not considered, this will degrade the performance of downlink power control algorithms.

To reduce performance degradation, in methods according to embodiments of the present invention, during power optimization in a partitioned wireless backhaul network, power optimization is performed for each neighborhood with consideration of both its in-neighborhood sum utility and an out-of-neighborhood sum utility. The latter is based on performance data reported by other neighborhoods to the centralized server.

In one embodiment, a system is provided for implementing a method of downlink power control with out-of-neighborhood utility evaluation using a self-learning approach which is coordinated by a centralized server, such as a MARA server. The method comprises, for each neighborhood independently, collecting the hub transmit powers and the corresponding RBM utilities for each served RBM. Each hub is configured to transmit data at a given transmit power to each served RBM. The performance of each served RBM, i.e., a utility such as throughput performance (Mb/s), is measured and reported back to its serving hub. The transmit power of each hub and the utilities of its served RBMs are reported to the centralized processing unit or server. That is, during a data collection phase, each hub transmits at a plurality of different power levels and obtains utilities for each served RBM for each power level. This phase is performed considering only in-neighborhood utilities. For example, for each neighborhood, the hub transmit power may be obtained using the power optimization method disclosed in the above referenced related U.S. patent application Ser. No. 14/073,459, filed Nov. 6, 2013 entitled "Method and System for Performance Management in a Wireless Backhaul Networks via Power Control". Alternatively, another appropriate power optimization method may be used. This initial power optimization process is performed independently for each neighborhood of the backhaul network, without consideration of out-of-neighborhood utilities. For each neighborhood, the centralized processing unit stores all reported hub transmit powers and RBM utilities in a utility lookup table. After sufficient data is reported for each neighborhood, power optimization is performed, by the centralized server, for each neighborhood, considering both in-neighborhood and out-of-neighborhood utilities, as will now be described.

An out-of-neighborhood sum utility evaluation is based on the stored data, i.e. hub transmit power and utility data for each served RBM, reported to the centralized server and stored in the look-up table, which is trained on a regular basis. The out-of-neighborhood utilities are evaluated at the centralized server based on reported data for actual throughput of each RBM at several different hub transmit powers, and by applying a curve fitting to estimate the dependence of an out-of-neighborhood sum utility on the in-neighborhood hub transmit power. Then, for each neighborhood, the centralized server performs an optimization of the sum utility over the neighborhood, by maximizing an appropriate objective function, taking into account both the in-neighborhood sum utility and out-of-neighborhood sum utilities.

Optimizing an objective function over the entire networks requires maximizing the sum of utilities for all hub-RBM links of the network:

$$\sum_{m}^{all\ hubs} \sum_{n}^{all\ RBMs} U_n(CINR_{mn}, BW_{mn})$$

where the utility for $U_n$ for RBM n is a function of the $CINR_{mn}$ for each hub-RBM link mn, and $BW_{mn}$, i.e., the bandwidth allocated to link mn.

To simplify, for a plurality neighborhoods $NBH_i$ $$\sum_{m}^{all\ hubs} U_m = \sum_{i}^{all\ NBHs} \sum_{m \in NBH_i} U_m$$

Thus, an objective function of each neighborhood ($NBH_i$) after partitioning is defined as:

$$\sum_{m \in NBH_i} U_m + \Delta$$

where $\Delta$ represents out-of-neighborhood utilities. Methods according to embodiments of the present invention seek to provide an evaluation of $\Delta$ with reduced computational complexity.

In methods according to exemplary embodiments of the present invention, the sum utility evaluation is based on stored power optimization data from each network neighborhood, which is obtained independently from each neighborhood considering only in-neighborhood utilities, i.e. hub transmit power and utility data for each served RBM, stored in the look-up table, which is trained on a regular basis. The out-of-neighborhood sum utilities are then evaluated at the centralized server based on reported data for actual throughput of each out-of-neighborhood RBM at several different hub transmit powers, and by applying a curve fitting to estimate the dependence of out-of-neighborhood sum utility on the hub transmit power. Then, for each neighborhood, the centralized server performs an optimization of the sum utility over the neighborhood, by maximizing an objective function, taking into account data for both in-neighborhood sum utilities and out-of-neighborhood sum utilities.

Based on the optimization, the centralized server then issues commands signalling a downlink transmit power to each hub of the neighborhood, and each hub configures its downlink transmit power accordingly. Thus, the method provides a method for power optimization in which out-of-neighborhood utilities are considered without requiring any message exchange among hubs.

An embodiment of the method will now be described in more detail with reference to Tables 1 and 2.

Table 1 below illustrates an example of a table of data reported by hubs and RBMs.

TABLE 1

| Example table of hub transmit powers and corresponding reported RBM utility performance | | | | | | | |
|---|---|---|---|---|---|---|---|
| Data set | Hub $TX_1$ | Hub $TX_2$ | ... | Hub $TX_M$ | RBM $U_1$ | RBM $U_2$ | ... | RBM $U_N$ |
| 1 | 10 dBm | −22 dBm | ... | 27 dBm | 10 Mb/s | 1 Mb/s | ... | 20 Mb/s |
| 2 | 20 dBm | 27 dBm | ... | −17 dBm | 20 Mb/s | 2 Mb/s | ... | 5 Mb/s |
| 3 | 13 dBm | −22 dBm | ... | 27 dBm | 15 Mb/s | 1 Mb/s | ... | 10 Mb/s |
| ... | | | | | | | |

The processing unit then computes the delta out-of-neighborhood utilities, that is, the change or difference in the sum utility for all out-of-neighborhood RBMs for each hub m transmit power relative to the current transmit power of hub m, as will be explained with reference to Table 3. In the exemplary embodiments, the delta out-of-neighborhood utilities are estimated based on curve fitting and solving the power optimization problem for each neighborhood, considering both their in-neighborhood and out-of-neighborhood sum utilities.

Figure 3:
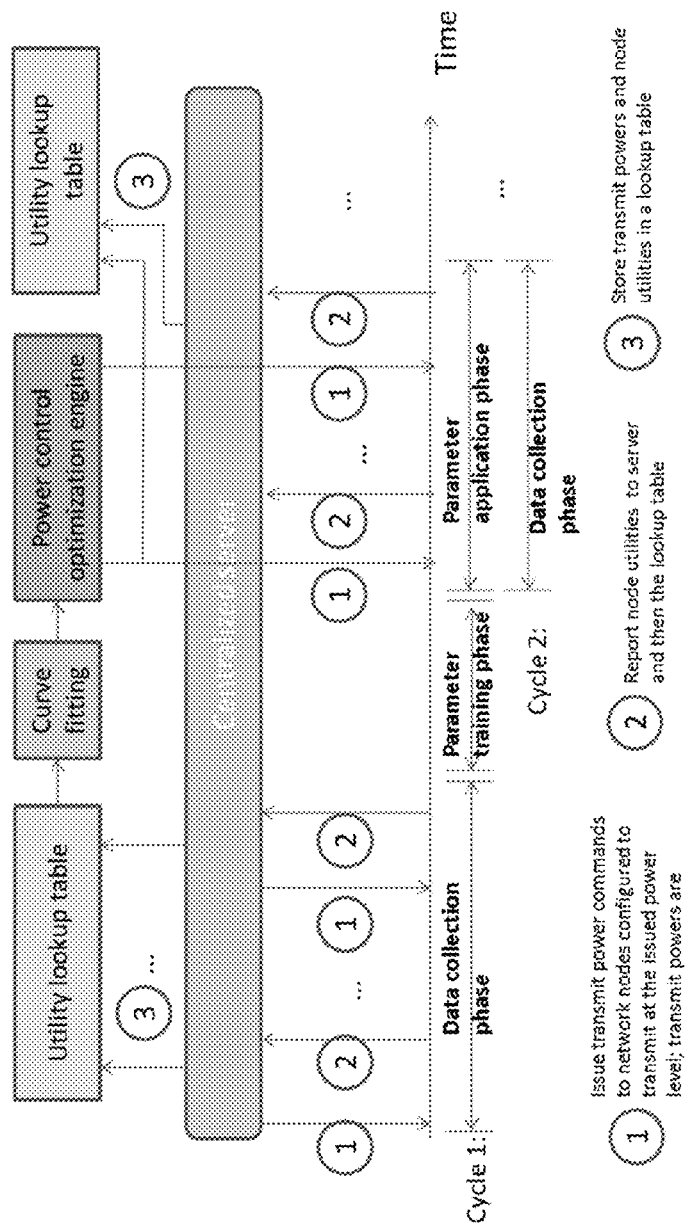
FIG. 3 illustrates schematically a timing diagram for a system and method for implementation of downlink power control in partitioned wireless backhaul networks according to an embodiment of the present invention comprising out-of-neighborhood utility evaluation.

FIG. 3 illustrates schematically a timing diagram for implementing a method of downlink power control in a partitioned wireless backhaul network according to an embodiment of the present invention, with out-of-neighborhood utility evaluation using a self-learning approach. Time is divided into cycles, and each cycle comprises a data collection phase, a parameter training phase, and a parameter application phase, as represented schematically in FIG. 3.

Data Collection Phase

In the data collection phase, power optimization is performed independently for each neighborhood, to optimize a sum utility across the neighborhood, without considering out-of-neighborhood utilities. The central processing unit issues transmit power commands to each hub to transmit at a selected power level, and the transmit power levels of all hubs and RBM utilities of all RBMs are reported to the centralized server and stored in a utility look-up table in the centralized server. Data are collected for different hub transmit powers for each hub and reported to the centralized server for storage in a utility look-up table, as illustrated in Table 1.

Each neighborhood reports its data to the centralized server, and the centralized server stores data for all neighborhoods in the utility look-up table. After sufficient data is reported and stored in the utility look-up table for each neighborhood, the centralized server can use stored data to evaluate out-of-neighborhood utilities.

Parameter Training Phase

Subsequently, the delta out-of-neighborhood utilities are computed for different hub transmit powers. In the parameter training phase, once enough data sets are collected the out-of-neighborhood utilities are evaluated. From the utility table (e.g. Table 1), for the m-th hub, rows are picked that list different transmit powers of the m-th hub, but have the same or similar transmit powers of all other hubs used in the current frame, e.g. selected rows as shown in Table 2.

TABLE 2

Example table of hub transmit powers and corresponding reported RBM utility performance for parameter training

| Data set | Hub $TX_1$ | Hub $TX_2$ | ... | Hub $TX_M$ | $RBM\ U_1$ | $RBM\ U_2$ | ... | $RBM\ U_N$ |
|---|---|---|---|---|---|---|---|---|
| 10 | −10 dBm | −22 dBm | ... | 27 dBm | 1 Mb/s | 1 Mb/s | ... | 20 Mb/s |
| 11 | 13 dBm | −22 dBm | ... | 27 dBm | 5 Mb/s | 2 Mb/s | ... | 10 Mb/s |
| 13 | 20 dBm | −22 dBm | ... | 27 dBm | 7 Mb/s | 3 Mb/s | ... | 1 Mb/s |
| ... | | | | | | | | |

For example, referring to Table 2, for Hub 1 (Hub $TX_1$) in the current frame, Hub 2 (Hub $TX_2$) transmits at −22 dBm, hub M (Hub TXm) transmits at 27 dBm. The desired rows a picked to form a look-up table dedicated to each hub and the following steps are performed.

From the look-up table for the m-th hub, look-up the sum utility of all the RBMs in other neighborhoods given the current transmit power of the m-th hub, say $U_{m0}$. Then, for each row k, compute the sum utility of all the RBMs in other neighborhoods given the corresponding transmit power level $P_{mk}$, say $U_{mk}$. Then, compute the difference or delta out-of-neighborhood utility $\Delta U_{mk}(P_{mk})=U_{mk}-U_{m0}$, and store the information in a table, for example as shown in Table 3.

TABLE 3

Example table of hub transmit powers and corresponding delta utilities for the m-th hub, assuming $U_{m0} = 10$ Mb/s.

| Hub $TX_m$ | $U_{mk}$ | $\Delta U_{mk}$ |
|---|---|---|
| −10 dBm | 20 Mb/s | 10 Mb/s |
| 13 dBm | 10 Mb/s | 0 Mb/s |
| 20 dBm | 7 Mb/s | −3 Mb/s |
| ... | ... | ... |

Figure 4:
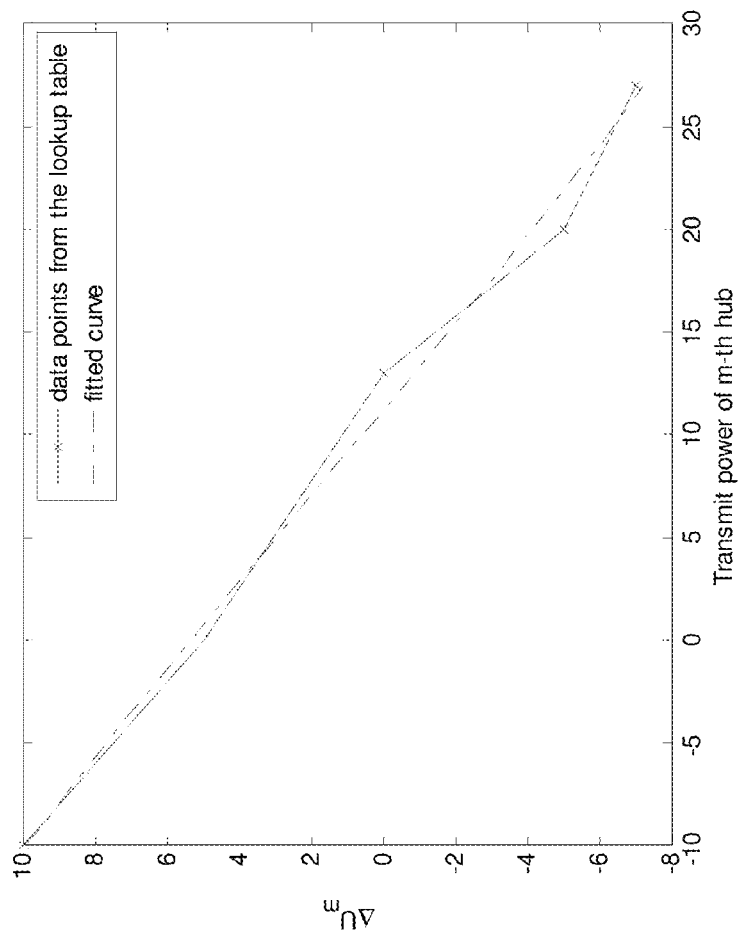
FIG. 4 shows a graph to illustrate network simulations for curve fitting based on a plot of the delta out-of-neighborhood utilities against the transmit power of the m-th hub.

The table thus represents a number of data points ($P_{m1}$, $\Delta U_{m1}$), ($P_{m2}$, $\Delta U_{m2}$) ... $P_{mk}$, $\Delta U_{mk}$) for the m-th hub, as illustrated in FIG. 4, which shows a plot of delta out-of-neighborhood utilities $\Delta U_m$ against hub transmit powers $P_m$, for the m-th hub. Based on these data points ($P_{mk}$, $\Delta U_{mk}$), for k>0, curve fitting is applied to obtain a polynomial curve that closely fits the data points, e.g., $\Delta U_m = f_m(P_m)$, as illustrated by the fitted curve in FIG. 4.

Parameter Application Phase

Then, the power optimization problem is solved for each neighborhood considering both in-neighborhood and out-of-neighborhood utilities. In the parameter application phase, once the fitted curve for each hub is obtained, each neighborhood optimizes the hub transmit power levels so as to maximize the sum of RBM utilities using the following sum utility objective function for each neighborhood $NBH_i$:

$$\Sigma_{m \in NBH_i}\{U_m(P_m) + \beta_m \Delta U_m(P_m)\}$$

where $P_m$ is the transmit power of the m-th hub, $U_m(P_m)$ is the utility of the m-th hub obtained given $P_m$, $\Delta U_m(P_m)$ is the delta out-of-neighborhood utility given $P_m$, and $P_m$ is a tunable parameter. The centralized processing unit issues power update commands and each hub configures its transmit power accordingly. Thus, this phase also becomes the data collection phase of the next cycle.

Each neighborhood may independently perform measurements of Radio Frequency Environment Characteristics (RFEC) for each hub-RBM radio link of its neighborhood, to generate an RFEC table or MARA Matrix which is stored by the centralized processing unit or server (MARA server), as described in the above referenced related co-pending patent applications. For power optimization, each neighborhood considers both in-neighborhood and out-of-neighborhood utilities as described above. The out-of-neighborhood utilities are evaluated at the centralized server based on actual throughput of each hub at different transmit powers, and by applying a curve fitting to estimate the out-of-neighborhood utilities. The out-of-neighborhood utility evaluation is based on a table look-up which is trained on a regular basis. Thus, the out-of-neighborhood utilities are considered without requiring any message exchange among hubs.

If each neighborhood performs power optimization and makes its own decision at the same time, the system performance might oscillate. A standard procedure can be used to ensure convergence, e.g. a diminishing value of $\beta_m$, as in any gradient search optimization algorithm. Alternatively, a sequential power update can be performed, in which nodes take turns to update their power levels by one.

In an alternative embodiment, in an initial data collection phase, a pre-deployment planning tool is used to determine the performance degradation of RBMs given different transmit powers of the m-th hub. The delta out-of-neighborhood utilities for each transmit power are reported by the pre-deployment planning tool to the centralized processing unit, to populate the look-up table. The estimated values from the pre-deployment tool are used to set initial power levels. After network deployment, subsequent data collection, parameter training, and data application phases may be carried out, as required, using in-service power and utility measurements as described above, to provide incremental improvement in power optimization.

Simulation Results

Network simulations were carried out using the following system level assumptions for a network similar to that illustrated in FIG. 1.

TABLE 4

ISD: 800 m
Deployment use case: 21 hubs
Dropping: random 4 RBMs per hub
Hub association/clustering: geographic
Objective function: weighted PF TABLE 4-continued Antenna patterns: MTI
Hub height: 45 m
RBM height: 5 m
Hub tilt option: fixed 10 degrees
RBM tilt options: serving hub pointing
Thermal noise: −174 dBm
Channel model: SUI-3
Bandwidth: 10 MHz
DL Pmax: 27 dBm
1 power zone
PHY abstraction: 2x2 MIMO with efficiency 81/140 KMeans++
Variables: different numbers of RF neighborhoods, Pmax vs. ICPM.

Figure 5:
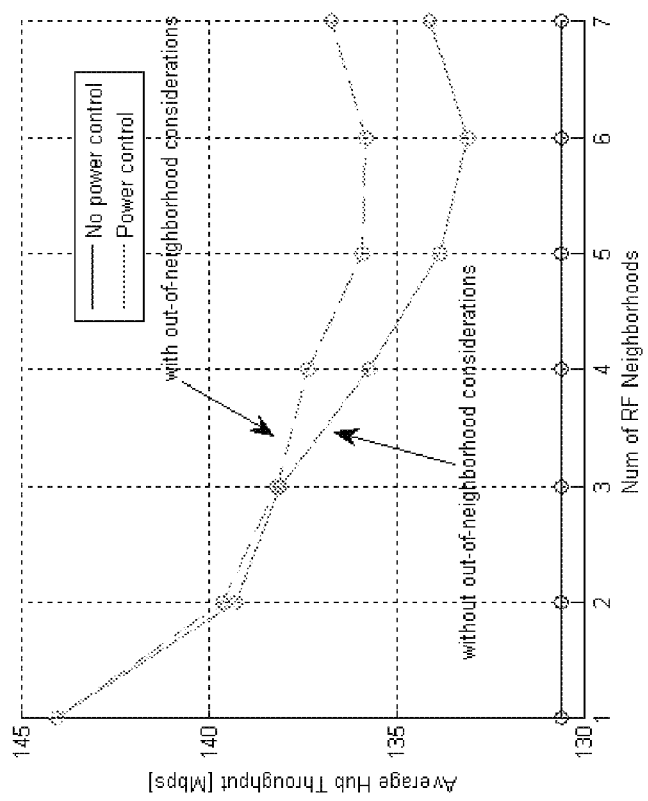
FIG. 5 shows a graph to illustrate network simulation results for Average Hub Throughput (Mbps) performance against the number of radio frequency RF neighborhoods, with and without out-of-neighborhood utility evaluation.

FIG. 5 shows a graph of average hub throughput performance plotted against the number of radio frequency neighborhoods, with and without the out-of-neighborhood utility evaluation. The y-axis shows the average hub throughput in Mb/s, while the x-axis shows the number of radio frequency neighborhoods. These simulation results were generated by simulation based on a fixed wireless backhaul network comprising 21 hubs and 84 RBMs, e.g. as represented in FIG. 1. These results show that with network partitioning, the performance degrades as the number of radio frequency neighborhoods increases. However, considering out-of-neighborhood utilities using a method according to an embodiment of the present invention, there is a reduction in performance degradation due to network partitioning.

Figure 6:
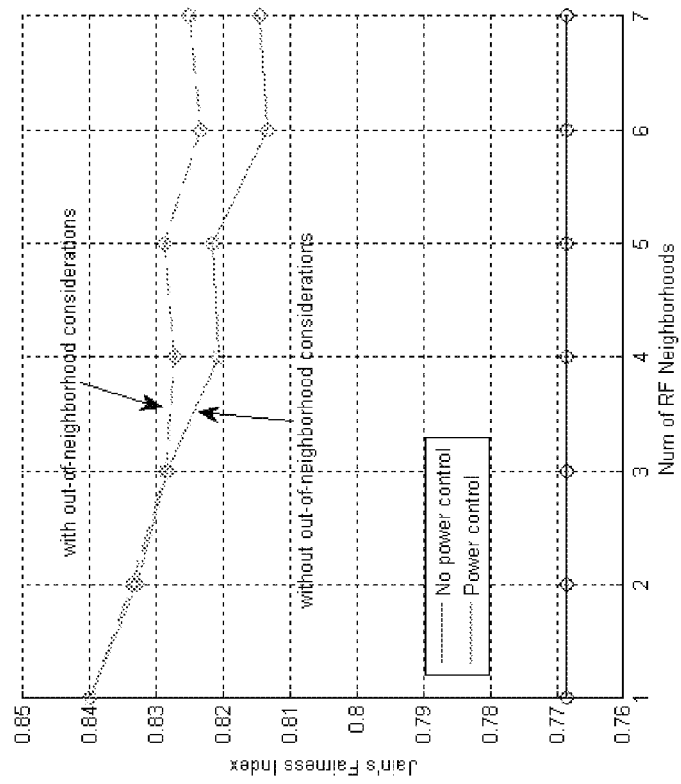
FIG. 6 shows a graph to illustrate network simulation results for a Fairness Index against the number of Radio Frequency (RF) neighborhoods, with and without out-of-neighborhood utility evaluation.

FIG. 6 shows a graph of a fairness performance plotted against the number of radio frequency neighborhoods with and without out-of-neighborhood utility considerations. The fairness performance is characterized by using the Jain's Fairness Index (FI):

$$FI = \frac{\left(\sum_{i=1}^{m} x_i\right)^2}{m\left(\sum_{i=1}^{m} x_i\right)^2},$$

where $x_i$ is the throughput of RBM i, and m is the number of RBMs in the wireless backhaul network. The y-axis shows the fairness performance, while the x-axis shows the number of radio frequency neighborhoods. These results illustrate that a method according to an embodiment of the present invention can reduce the fairness performance degradation due to network partitioning when out-of-neighborhood utility evaluation is considered.

Figure 7:
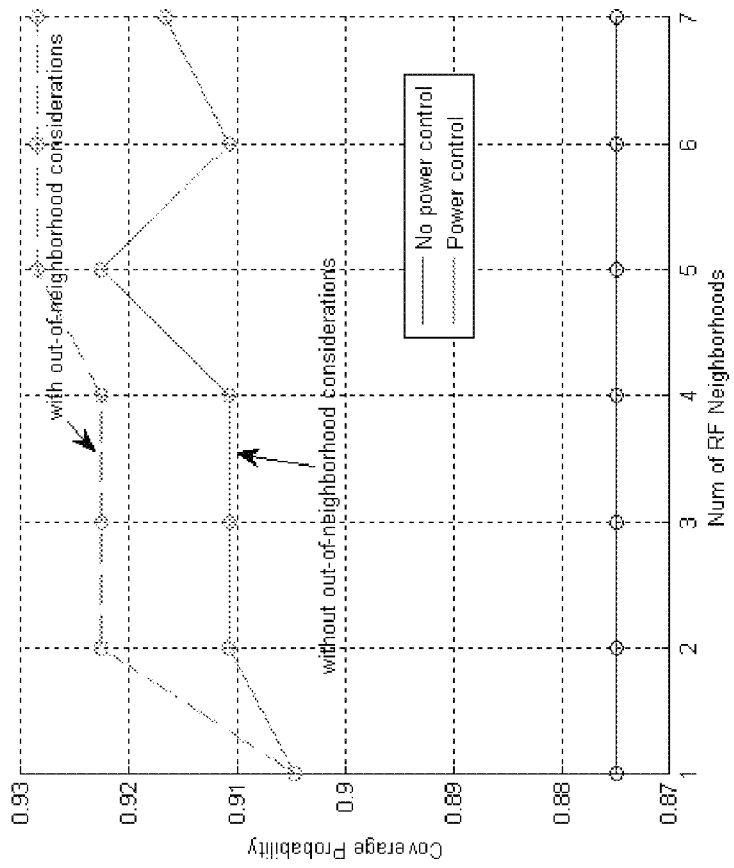
FIG. 7 shows a graph to illustrate network simulation results for network performance as measured by a network coverage probability against the number of radio frequency RF neighborhoods, with and without out-of-neighborhood utility evaluation.

FIG. 7 shows a graph of a network coverage performance plotted against the number of radio frequency neighborhoods with and without out-of-neighborhood utility considerations. The coverage performance is characterized by this equation:

$$\text{Coverage Probability} = \frac{I(x_i)}{m},$$

where $x_i$ is the throughput of RBM i, $$I(x_i) = \begin{cases} 1, & x_i > 0 \\ 0, & x_i = 0 \end{cases}$$

and m is the number of RBMs in the wireless backhaul network. The y-axis shows the coverage performance, while the x-axis shows the number of radio frequency neighborhoods.

These simulation results illustrate that a method according to an embodiment of the present invention can help maintain the network coverage performance in a partitioned network when out-of-neighborhood utilities are considered.

As mentioned above, FIG. 8 illustrates schematically elements of a system comprising a centralized processing server having a processing unit for implementing a method for downlink power optimization in a partitioned wireless backhaul network according to an embodiment of the present invention. The centralized server may provide other control functions for the wireless backhaul network and may for example function as a MARA server for performing RFEC measurements for the network. For performing a method of downlink power optimization, the centralized server comprises a processing unit and data storage means, e.g. data storage for storing look-up tables of reported data, and computer readable media storing programming instructions or software for implementing method steps comprising: receiving and storing reported data, performing an out-of-neighborhood utility evaluation based on stored data, performing curve fitting on data for each hub to obtain dependence of a delta sum utility on hub transmit power, determining hub transmit powers considering in-neighborhood and out-of-neighborhood utility evaluation, updating tables of reported data and issuing hub transmit power update commands. The system provides suitable communications interfaces and links between the centralized server and the hubs for sending and receiving control messages and data for implementing power control, e.g. control messages or signalling, comprising commands to the hubs, to set initial hub transmit powers for data collection and training cycles, and to provide hub transmit power updates or change commands after downlink power optimization.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of downlink power optimization in a partitioned fixed wireless backhaul network comprising a plurality of nodes, wherein each node comprises at least one hub module, and each hub module serves one or more remote backhaul modules (RBMs) through hub-RBM radio links, the network being partitioned into a plurality of neighborhoods, each comprising a subset of the plurality of nodes, the method comprising:

for each neighborhood independently, performing a downlink power optimization by optimizing a sum utility over the neighborhood comprising in-neighborhood utilities only;

reporting power optimization data to a centralized processing unit;

storing reported power optimization data for each neighborhood for look-up by the centralized processing unit;

in the centralized processing unit, for each neighborhood, performing a downlink power optimization by optimizing a sum utility comprising in-neighborhood utilities and out-of-neighborhood utilities, said out-of-neighborhood utilities being obtained by an out-of-neighborhood utility evaluation of the stored power optimization data reported by other neighborhoods; and issuing hub transmit power update commands.

2. The method of claim 1, wherein, for each neighborhood comprising m hubs, the reported power optimization data comprise sets of data for each of a plurality of different hub transmit powers, and each set comprising: a hub transmit power of hub m, a hub transmit power for each other hub of the neighborhood and a RBM utility of each served RBM.

3. The method of claim 2, wherein the RBM utility comprises a throughput performance.

4. The method of claim 1, wherein the reported power optimization data for all neighborhoods are stored by the centralized processing unit in a look-up table, and for the each neighborhood, the out-of-neighborhood sum utility evaluation comprises, for each hub m of the neighborhood, from the power optimization data reported from said other neighborhoods, obtaining a sum utility of out-of-neighborhood RBMs for each reported transmit power of hub m.

5. The method of claim 1, wherein the reported power optimization data for all neighborhoods are stored by the centralized processing unit in a look-up table, and for the each neighborhood, the out-of-neighborhood utility evaluation comprises, for each hub m of the neighborhood, from the power optimization data reported from said other neighborhoods, obtaining a function comprising a delta sum utility of all out-of-neighborhood RBMs for each transmit power of hub m.

6. The method of claim 1, wherein the reported power optimization data for all neighborhoods are stored by the centralized processing unit in a look-up table, and for the each neighborhood, the out-of-neighborhood utility evaluation comprises:

performing a look-up of reported power optimization data for each hub m and forming a secondary look-up table with reported power optimization data specific to each hub m;

from data in the secondary look-up table for hub m, computing a sum utility $U_{mo}$ of all RBMs in said one or more other neighborhoods for a current transmit power of hub m and computing a sum utility $U_{mk}$ of said RBMs in said one or more other neighborhoods for each other reported transmit power k of the hub m;

computing a delta sum utility $\Delta U_{mk} = U_{mo} - U_{mk}$ for transmit power k relative to the current transmit power, thereby generating a plurality of data points $(P_{m1}, \Delta U_{m1}) \ldots (P_{mk}, \Delta U_{mk})$; and applying curve fitting to obtain a polynomial function fm that closely fits the data points $\Delta U_m = f_m(P_m)$.

7. The method of claim 6, wherein for each neighborhood $NBH_i$ performing power optimization considering in-neighborhood and out-of-neighborhood utilities, comprises optimizing the hub transmit power levels so as to maximize the sum of RBM utilities using the following sum utility objective function:

$$\Sigma_{m \in NBH_i}\{U_m(P_m) + \beta_m \Delta U_m(P_m)\}$$

where $P_m$ is the transmit power of the m-th hub, $U_m(P_m)$ is the utility of the m-th hub obtained given $P_m$, $\Delta U_m(P_m)$ is the delta out-of-neighborhood utility given $P_m$, and $P_m$ is a tunable parameter.

8. The method of claim 6, wherein the fitted polynomial function for each hub m provides a delta sum utility of all out-of-neighborhood RBMs for each power level option.

9. The method of claim 1, wherein updating of hub transmit power levels after optimization is performed:
   a) simultaneously in all neighborhoods, or
   b) sequentially by neighborhood.

10. The method of claim 1, wherein initial power optimization data is estimated for each neighborhood using a pre-deployment planning tool and reported to the centralized processing unit for storage.

11. A centralized or distributed non-transitory computer readable storage medium storing reported data and storing programming instructions for execution by one or more processing units of a fixed wireless backhaul network comprising a plurality of nodes, wherein each node comprises at least one hub module, and each hub module serves one or more remote backhaul modules (RBMs) through hub-RBM radio links, said programming instructions implementing, in one or more of said processing units, the steps of claim 1.

12. A system for downlink power optimization in a partitioned fixed wireless backhaul network comprising a plurality of nodes, wherein each node comprises at least one hub module, and each hub module serves one or more remote backhaul modules (RBMs) through hub-RBM radio links, the network being partitioned into a plurality of neighborhoods, each comprising a subset of the plurality of nodes, and the system comprising:

a centralized processing unit in communication with each hub;

a centralized or distributed computer readable storage medium storing programming instructions for execution by the centralized processing unit and/or processing units of each hub, said programming instructions implementing the steps of:

for each neighborhood independently, performing a downlink power optimization by optimizing a sum utility over the neighborhood comprising in-neighborhood utilities only; and reporting power optimization data to the centralized processing unit for storage;

data storage means for storing said reported power optimization data for each neighborhood for look-up by the centralized processing unit;

said programming instructions further implementing the steps of:

in the centralized processing unit, for each neighborhood, performing a downlink power optimization by optimizing a sum utility comprising in-neighborhood utilities and out-of-neighborhood utilities, said out-of-neighborhood utilities being obtained by an out-of-neighborhood utility evaluation of the stored power optimization data reported by other neighborhoods; and issuing hub transmit power update commands.

13. The system of claim 12, wherein said data storage means stores, for each neighborhood comprising m hubs, reported power optimization data comprise sets of data for each of a plurality of different hub transmit powers, wherein each set comprising: a hub transmit power of hub m, a hub transmit power for each other hub of the neighborhood and a RBM utility of each served RBM.

14. The system of claim 12, wherein the data storage means comprises a look-up table storing the reported power optimization data for all neighborhoods.

15. The system of claim 14, wherein the data storage means further comprises secondary look-up tables, storing for each hub m, a sum utility of out-of-neighborhood RBMs for each reported transmit power of hub m, and a delta sum utility of all out-of-neighborhood RBMs for each transmit power of hub m relative to the current transmit power of hub m.

16. The system of claim 12, wherein:
the data storage means comprises a look-up table storing reported power optimization data for all neighborhoods; and
the data storage means further comprises, for each neighborhood, secondary look-up tables storing for each hub m of the neighborhood, data for each hub m comprising a sum utility $U_{mo}$ of all RBMs in said one or more other neighborhoods for a current transmit power of hub m, a sum utility $U_{mk}$ of said RBMs in said one or more other neighborhoods for each other reported transmit power k of the hub m; a delta sum utility $\Delta U_{mk}=U_{mo}-U_{mk}$ for transmit power k relative to the current transmit power, to provide a plurality of data points $(P_{m1}, \Delta U_{m1}) \ldots (P_{mk}, \Delta U_{mk})$; and the programming instructions further implement curve fitting to obtain a polynomial function $f_m$ that closely fits the data points $\Delta U_m = f_m(P_m)$.

17. The system of claim 16, wherein said programming instructions perform power optimization considering in-neighborhood and out-of-neighborhood utilities, comprising optimizing the hub transmit power levels so as to maximize the sum of RBM utilities using the following sum utility objective function:

$$\Sigma_{m \in NBH_i} \{U_m(P_m) + \beta_m \Delta U_m(P_m)\}$$

where $P_m$ is the transmit power of the m-th hub, $U_m(P_m)$ is the utility of the m-th hub obtained given $P_m$, $\Delta U_m(P_m)$ is the delta out-of-neighborhood utility given $P_m$, and $\beta_m$ is a tunable parameter.

18. The system of claim 17, wherein stored data for the fitted polynomial function for each hub m provides a delta sum utility of all out-of-neighborhood RBMs for each power level option.

19. The system of claim 12, wherein said programming instructions further provide for updating of hub transmit power levels after optimization:
   a) simultaneously in all neighborhoods,
   or
   b) sequentially by neighborhood.

* * * * *